United States Patent [19]
Mueller

[11] 3,748,776
[45] July 31, 1973

[54] FISH AND BAIT TRAP

[76] Inventor: Walter F. Mueller, 301 Pon St., Ballinger, Tex. 76821

[22] Filed: Oct. 24, 1972

[21] Appl. No.: 299,916

[52] U.S. Cl. ............................................... 43/103
[51] Int. Cl. ............................................ A01k 69/06
[58] Field of Search .............................. 43/103, 100

[56] References Cited
UNITED STATES PATENTS

| | | | |
|---|---|---|---|
| 2,736,986 | 3/1956 | Goldstein | 43/103 |
| 2,755,594 | 7/1956 | Booth et al. | 43/100 |

*Primary Examiner*—Robert Peshock
*Assistant Examiner*—Daniel J. Leach
*Attorney*—Marcus L. Bates

[57] ABSTRACT

A floating fish and bait trap assembly having a cylindrical cage within which fish may live when trapped therein.

A shelter having spaced floats thereon is superimposed over the cage in journaled relationship therewith to enable the cage to be rotated relative to the shelter, and further to protect the cage from the elements.

A yoke is attached to and depends away from the journal means for enabling the apparatus to be manipulated in the water and on the land. The apparatus can be beached, and then pulled along the beach with the cage supporting the apparatus in a manner similar to a wheeled vehicle.

9 Claims, 20 Drawing Figures

3,748,776

PATENTED JUL 31 1973 3,748,776
SHEET 2 OF 3

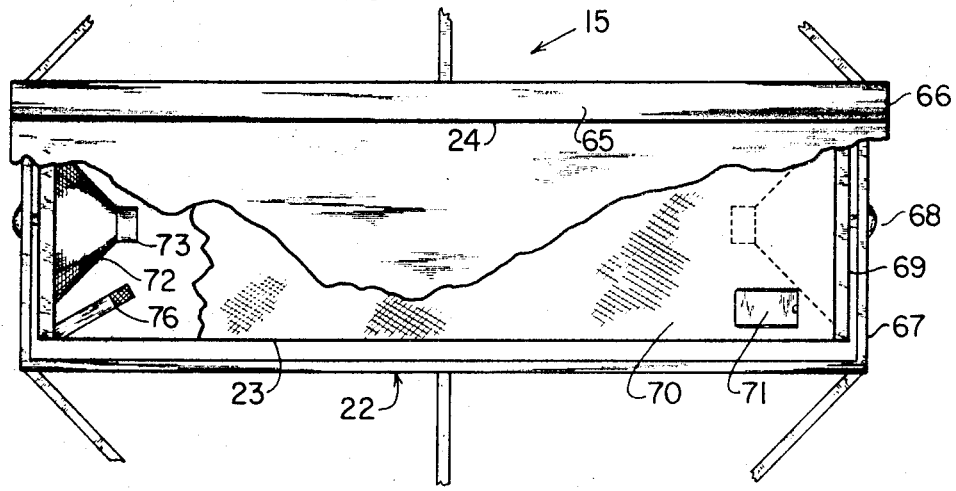
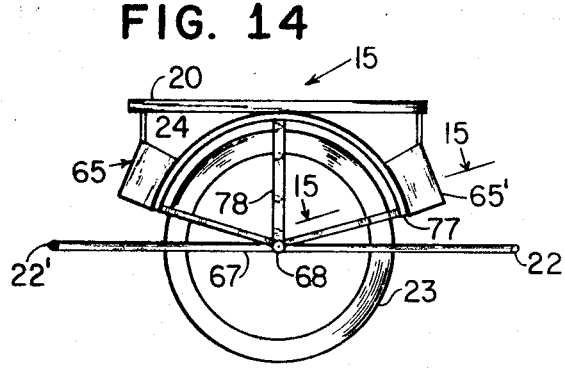
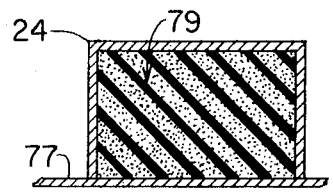
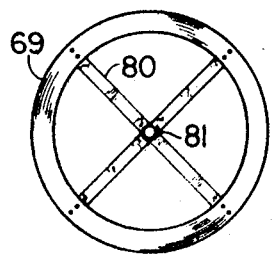
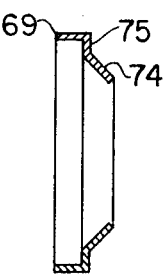
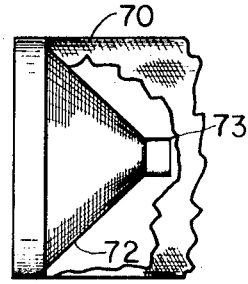
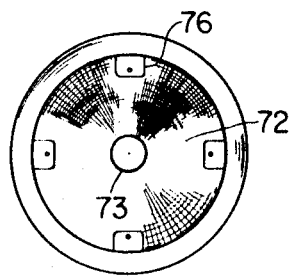
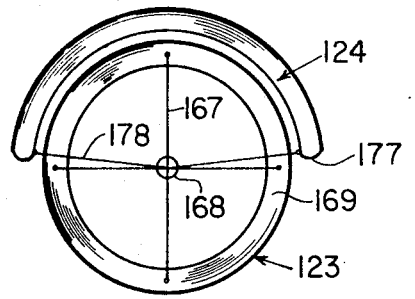

FISH AND BAIT TRAP

BACKGROUND OF THE INVENTION

One of the most economical and practical methods of harvesting fish is to utilize an open-work cage having opposed open ends closed by truncated conical inlet funnels which provide a trap means at each extremity of the cylindrical cage so that when the apparatus is submerged within water, fish swim thereinto where they live until the trap is removed from the water and the fish removed therefrom.

A major disadvantage of harvesting fish in this manner is the difficulty encountered in removing the cumbersome trap from the water. Sometime a gin pole hoist arrangement is employed for lifting the fish containing trap from the water; however, this expedient necessitates a permanent installation of the hoisting apparatus and accordingly prevents placing the trap out of reach of the hoist mechanism.

Further, this type prior art trap, if released, sinks to the bottom where the harvested fish are precluded from contact with the surface of the water and accordingly the fish are isolated from their essential air supply.

Where a trap is provided with floats and anchored offshore, the partially submerged trap exposes the fish to the deleterious effects of the elements thereby reducing the quality of fish.

It would therefore be desirable to have made available an apparatus for trapping fish which overcomes the objections above, and yet includes all of the desirable attributes associated with various apparatus of the above described type.

SUMMARY OF THE INVENTION

This invention comprehends a floating fish and bait trap assembly having a cylindrical cage journaled to a shelter which is spaced apart and superimposed thereover. A float maintains the apparatus partially submerged in a body of water, while a yoke enables the apparatus to be beached and then pulled along the beach with the cage supporting the remainder of the apparatus in a manner similar to a wheeled vehicle.

The cage of the apparatus is provided with spaced end portions which reinforce the cylinder and at the same time provides means by which an inwardly directed truncated cone can be attached thereto for forming a trap means at either end thereof.

A novel draw works arrangement provides a system for manipulating the trap into and out of the water for commercial harvesting of fish.

A primary object of the present invention is to provide a floating fish and bait trap assembly having an improved cage within which fish may live when trapped therein.

Another object of the invention is to provide a floating fish and bait trap assembly which can be moved in low friction relationship relative to a supporting surface.

A further object of this invention is to provide a draw works system by which floating fish traps may be placed within and retrieved from a body of water.

A still further object of this invention is to provide improvements in floating fish and bait trap assemblies.

Another and still further object is the provision of improvements of methods of harvesting fish with mechanical fish and bait trap assemblies.

An additional object of this invention is to provide a means of sustaining trapped fish by the provision of a shaded air supply in conjunction with the floating fish and bait trap assembly.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 13 is a fragmentary enlarged top plan view of part of the apparatus disclosed in FIG. 1;

FIG. 14 is a reduced side view of the apparatus disclosed in FIG. 13;

FIG. 15 is an enlarged fragmentary cross-sectional representation taken along line 15—15 of FIG. 14;

FIG. 16 is a side elevational view of part of the apparatus disclosed in the foregoing Figures;

FIG. 17 is a cross-sectional view taken along line 17—17 of FIG. 16;

FIG. 18 is a fragmentary elevational view of part of the apparatus disclosed in FIG. 13;

FIG. 19 is an end view of FIG. 18; and

FIG. 20 schematically discloses in a diagrammatical manner a cross-sectional view of another embodiment of the apparatus similar to the disclosure set forth in FIG. 13.

DETAILED DESCRIPTION OF THE PREFERRED EMBODIMENTS

Figure 1:
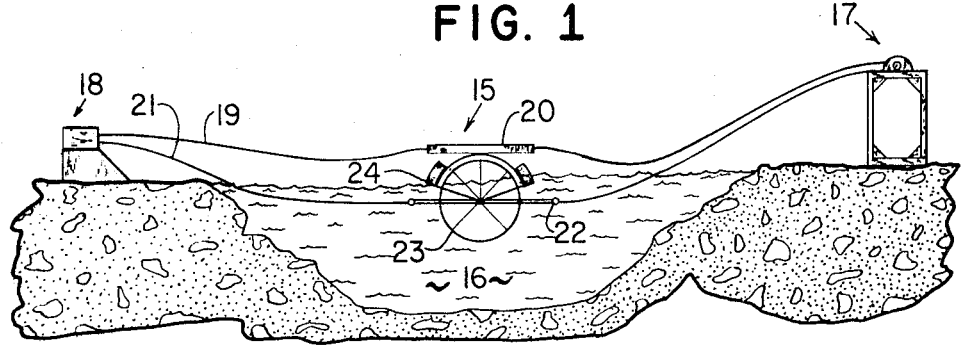
FIG. 1 is a diagrammatical representation of a cross-section of a part of the earth wherein the present invention is disclosed in operative relationship therewith.

FIG. 1 disloses a floating fish and bait trap assembly 15 made in accordance with the present invention, and which includes a fish trap in the form of a cylindrical cage 23 within which fish may live when trapped therein. The cage preferably is in the form of an open work elongated metallic cylinder; as for an example, a cylinder made of expanded steel or aluminum metal, and having opposed open ends closed by truncated conical inlet funnels. The funnels form a trap and may also be fabricated from metallic open work material.

The assembly, in the illustration of FIG. 1, is floating in a body of water 16 in close proximity to a beach or shore upon which there is disposed a draw works 17 and a dead man 18.

An endless cable is rove between the draw works and the dead man with the trap apparatus being interposed in one of the cable lengths so that one of the resulting lines 19 is slidably received through a guide 20 of the apparatus, while the other cable length or line 21 is removably attached to the depending ends of the yoke at 22.

Figure 2:
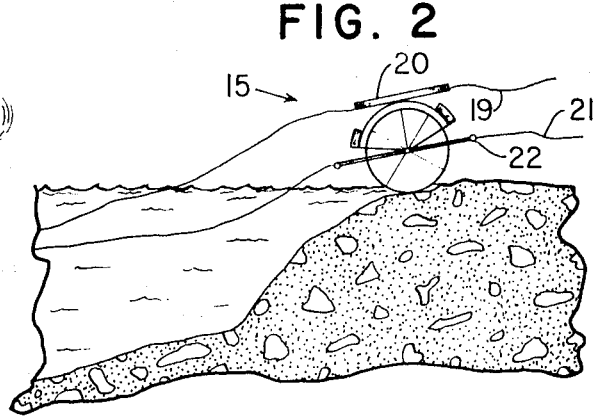
FIG. 2 is a fragmentary view of the cross-section representation of FIG. 1, with the apparatus disclosed in a different operating configura-tion.

As seen in FIG. 2, the trap assembly has been beached with the cylindrical cage having the lowermost portion thereof in contact with a supporting surface so that the cylindrical cage makes rolling contact in low friction engagement with the ground.

Figure 3:
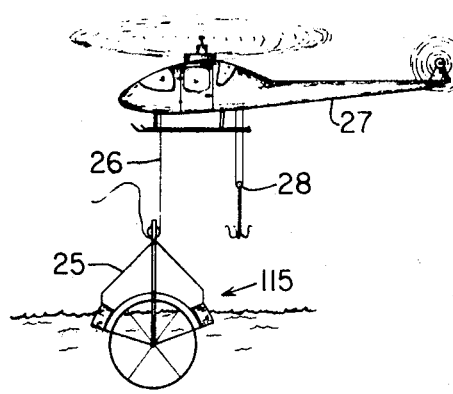
FIG. 3 is similar to FIG. 1 in some respects and illustrates another embodiment of the invention.
Figure 4:
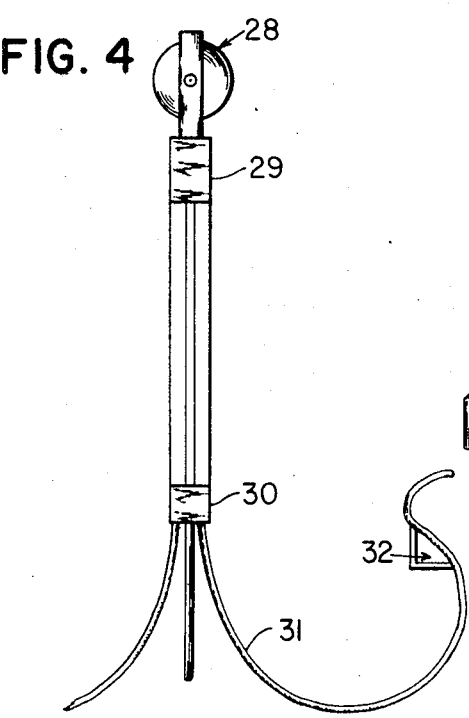
FIG. 4 is an enlarged fragmentary elevational view of part of the apparatus seen in FIG. 3.
Figure 5:
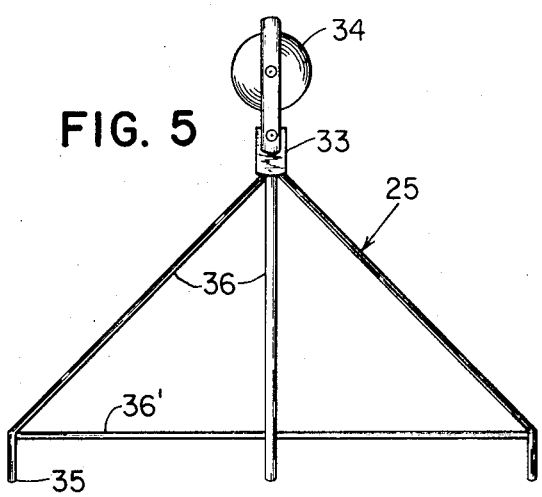
FIG. 5 is an enlarged elevational view of part of the apparatus disclosed in FIG. 3.

In FIGS. 3–5, there is disclosed a gantry 25 having a line 26 rove therethrough so that a helicopter 27 can lower the apparatus into a body of water and later retrieve the apparatus by engaging the gantry with the grappling hook assembly 28.

The grappling hook has a pulley at the upper end thereof, with the hook being attached to a sleeve 29 which in turn is rigidly affixed to the illustrated three legs. The legs are bundled together at 30 and radiate apart 120° from one another as seen at 31 so as to enable the formation of a reinforced free end portion at 32.

As seen illustrated in FIG. 5, the gantry includes a swivel 33 underlying a pulley 34 so that the lower terminal end 35 of legs 36 may be attached to the trap assembly. Stiffeners 36' maintain the legs in proper spaced relationship.

Figure 6:
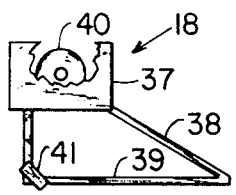
FIG. 6 is an enlarged fragmentary side elevational view of part of the apparatus disclosed in FIG 1.
Figure 7:
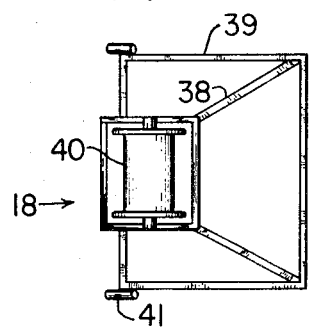
FIG. 7 is a top plan view of the apparatus disclosed in FIG. 6.
Figure 8:
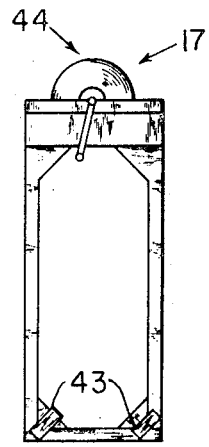
FIG. 8 is a side elevational view of part of the apparatus disclosed in FIG. 1.
Figure 9:
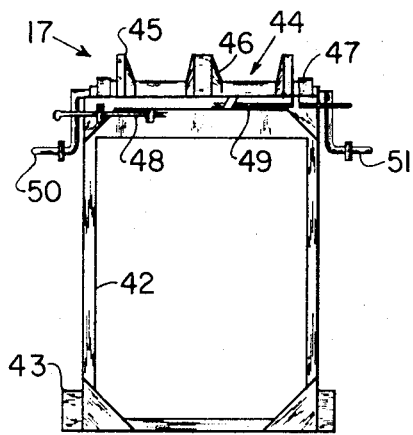
FIG. 9 is a front elevational view of the apparatus disclosed in FIG. 8.

As seen in the details of FIGS. 6 and 7, the beforementioned dead man is comprised of housing 37 which is rigidly affixed to a truss-work comprised of metal members 38, 39, with the housing enclosing a drum 40 about which the aforementioned line 19, 21, is rove. Anchor guide means 41 enables a stake to be driven therethrough and into the ground thereby securing the dead man to the beach.

In FIGS. 8–12, there is disclosed the draw works used in conjunction with the trap assembly. As seen in the Figures, a framework 42 forms a portion of the drawworks, and includes a collar 43 affixed thereto which enables a stake to be set at an angle respective to the ground for securing the draw works to the beach in the same described manner set forth in conjunction with the dead man.

A pair of axially aligned adjacent drums 44 each have a longitudinal length defined by the illustrated inwardly angled walls 45, 46, with the drums being journaled to the framework by any suitable bearing on journal means 47. Brake means 48, 49, respectively, are slidably received in the illustrated fasteners for engaging handles 50, 51, respectively, of the two drums.

Figure 10:
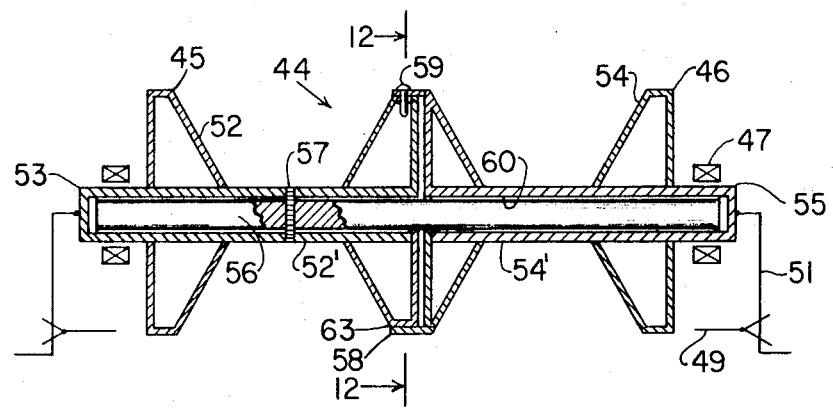
FIG. 10 is an enlarged cross-sectional view of part of the apparatus disclosed in FIG. 9.

As best seen in FIG. 10, one of the drums has a longitudinal length described by the illustrated sloped circumferentially extending wall 52 which is attached, as by welding, to the cylinder 52'. End portion 55 of the drum is attached to one of the diagrammatically indicated handles 51.

The adjacent drum is similarly provided with spaced apart sloped walls 54 attached to a cylinder 54' with the end portion 55 being attached to its associate handle 51. Inner shaft member 56 is drilled so that pin 57 anchors the drums thereto.

One drum has a circumferentially extending skirt member 58 extending in overlapping relationship respective of the other drum so that pin 59 can be placed through the concentrically arranged overlapping coacting portions of the adjacent members of the two adjacent drums, thereby effectively and selectively locking one drum to the other. It will be noted that inside circumferentially extending wall surface 60 of the hollow shaft is rotatably received about the solid shaft 56 so that when pin 59 is removed, one drum rotates relative to the solid shaft and to the other drum.

Figure 12:
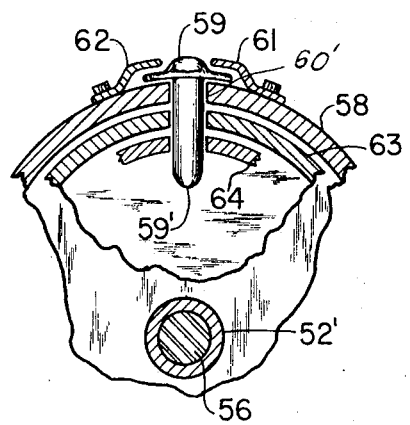
FIG. 12 is an enlarged fragmentary part cross-sectional view taken along line 12—12 of FIG. 10.
Figure 11:
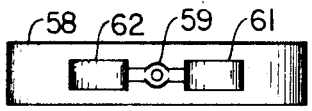
FIG. 11 is a top plan view of part of the apparatus disclosed in FIG. 10.

As best seen in the illustration of FIGS. 11 and 12, the before-mentioned pin 59 is received through aperture 60' with the aperture being centrally located relative to lock members 61, 62. The lock members are fixed to skirt 58 by any convenient means. Apertured member 64 underlies skirt 63 and is attached to structure which forms part of drum 45. The reduced diameter end 59' of the pin is captured between the spaced apart members 61, 62. The enlarged portion of the pin preferably has opposed ears which are received under member 61, 62, so that the pin can be rotated 90° and lifted free from the assembly.

As seen illustrated in FIGS. 13–19, the floating fish and bait trap assembly 15 preferably has the shelter thereof longitudinally extended so that opposed terminal ends 66 thereof extend beyond the cylindrical cage when superimposed therabove. The illustrated spaced apart floats in the form of air tanks 65 preferably are coextensive with the longitudinal opposed edge portions of the shelter. Affixing the tanks in this location reinforces the shelter and provides a monocoque structure. The beforementioned yoke 22 extends in opposed directions from the apparatus and includes framework 67 which extends about the entire cage, thereby enabling journal means 68 to be affixed to the framework with the longitudinally extending axial axis of the cage being aligned with the two opposed journal means. Reinforcing end pieces 69 are affixed to the open work metal 70 of the cage, while members 80 have the depending ends thereof attached to member 69. The beforementioned journal means are attached to the intersection 81 of the members, thereby enabling a load to be transferred from the yoke 22, into the framework, into the journal means, into members 80, plate member 69, and thence into the open frame work 70, and vice versa.

Door 71 can be slidably opened so as to enable one to retrieve the fish from within the cage. The cage includes the beforementioned truncated conical inlet funnels 72 made of open work metal or plastic which optionally includes a metal skirt 73 of limited length attached to the marginal end portion thereof.

As best seen in FIG. 17, the rim 69 is bent as illustrated at 74, 75, to provide a circumferentially extending reinforcement at 69 to which the marginal circumferentially extending edge portion of the expanded metal 70 can be attached, and which further provides a circumferentially extending marginal edge portion 74 to which the largest circumferentially extending marginal edge portion of the truncated cone 72 can be attached thereby providing a rigid structure which is simple in design, self-supporting, and low in cost.

Conveniently arranged about the rim 69 are the illustrated spaced apart feeders 76 which extend inwardly into the cage for the purpose of attracting fish and enticing them to enter through the trap means while at the same time preventing untrapped fish from stealing the bait.

As seen in FIG. 14, the end portion 77 of the shelter preferebly is spaced slightly apart from the yoke 22. If deemed desirable, this shelter edge portion could be extended into contact with the yoke so as to further reinforce the apparatus; however, such a design expedient is considered unnecessary because it is preferred to build the float with sufficient volume to cause the cage to float with less than 25 percent of the free volume thereof being disposed above the surface of the water. The shelter preferably is attached to the frame by means of the illustrated radiating members 78. If deemed desirable, the shelter could be journaled rather than fixed to the yoke, and either choice of design is considered to fall within the comprehension of this invention. If deemed desirable, the interior of the floats can be filled with foamed plastic 79.

The rim 69 of the cage is provided with spokes 80 which may vary in number, with the spokes intersecting at 81 where they are journaled at location 68 so that the entire cage can rotatably support the remainder of the entire apparatus.

In the modification set forth in FIG. 20, the float and shelter 177 is in the form of a hollow member 124 having legs attached thereto and journaled to a cage 123 by journaled means 168. Members 167, 178, maintain the structure properly spaced apart one from another as in the before described manner. The float 124 is a cantilever structure comprised of spaced apart metal walls, connected together at the peripheral edge portions thereof, or alternatively can be made of plastic, including foam plastic such as polyurethane or polystyrene, for example. Of course, where foamed plastic is used there would be no necessity for the illustrated hollow interior 124.

In operation, the bait is placed within the feeders 76, after which the assembly is rolled along the beach in the illustrated manner FIG. 2 until it is afloat within a body of water 16. This translocation of the assembly can be accomplished be either adding a 20 foot arm onto the yoke 22 and manually pushing the empty assembly into the body of water, or alternatively utilizing the method set forth in FIGS. 1–3.

When it is deemed that sufficient fish are caught within the cage, the assembly is retrieved by pulling it from the body of water until the cage contacts the beach, and thereafter the apparatus is pulled by the yoke causing the cage to make rolling contact with the ground as the lowermost portion of the cage rollingly supports the entire assembly. This sequence of events is referred to herein as "beaching." Door 71 is opened, the fish removed therefrom, and the apparatus returned to service.

The ends of lines 19, 21, can each be rove about winches 45, 46 in opposite directions of rotation so as to enable the two drums to be locked together, thereby enabling either handle 50 or 51 to cause the drums to rotate whereupon the assembly is moved into the body of water. When it is desired to beach the apparatus the handle is rotated in the opposite direction. Should the line become taut or unduly slack then pin 59 can be removed from the drums so as to enable either of the winches to individually control the tension in either of the lines 19 or 21.

I claim:

1. In a floating fish and bait trap assembly having a cylindrical cage within which fish may live when trapped therein, the improvement comprising:

a shelter spaced from and superimposed over said cage, journal means affixed to the longitudinal axis of said cage and to said shelter to enable said cage to be rotated relative to said shelter;

said shelter having spaced apart longitudinally extending depending edges which terminate short of the lowermost portion of the cage so that the lowermost portion of the cage bottom supports the apparatus when the apparatus is placed upon a supporting surface; said shelter including a float affixed thereto for imparting sufficient buoyancy into the assembly so that part of said cage is supported above the water line when the assembly is floating in water;

a yoke means connected to said journal means for forcing said assembly to move laterally of the longitudinal axis of the cage; so that a line can be attached to said yoke, and the apparatus beached and then pulled along the beach with the cage supporting the apparatus as the cage contacts the ground with a rolling motion.

2. The apparatus of claim 1 wherein said shelter is arcuate in minor cross-section and longitudinally extends in overlapping relationship relative to the cage.

3. The apparatus of claim 1 wherein said yoke means includes spaced members which depend in opposed relationship from the assembly so that a line can be attached to either yoke and the assembly moved in either of two opposed directions.

4. The apparatus of claim 1 wherein said yoke means depends in opposed relationship from the assembly so that a line can be attached to either depending portion of the yoke means, to enable the assembly to be moved in either of two opposed directions;

a draw works, a dead man spaced from said draw works, an endless cable rove between said draw works and dead man, said apparatus being interposed in one length of said cable with the yokes being connected to form a continuation of the endless cable, so that the draw works can be used to move the trap assembey along the length of the enless cable.

5. The apparatus of claim 4 wherein said draw works include spaced drums rotatably received on a common axis; means for selectively rotating either drum; means for selectively locking said drums together so that they rotate as s single unit.

6. The apparatus of claim 5 and further including break means by which either said drum can be selectively locked.

7. The apparatus of claim 1 and further including a gantry overlying said apparatus; a pulley in the apex of said gantry so that the apparatus can be lowered into the water by said pulley and later on retrieved by engaging the legs of said gantry with a grappling hook.

8. The apparatus of claim 1 wherein said shelter is comprised of an arcuate hollow member so as to form said float.

9. The apparatus of claim 1 wherein said float includes elongated chambers affixed to the marginal longitudinally extending edge portions of said shelter.

\* \* \* \* \*